Sept. 22, 1964          H. WARNER          3,149,921

METHOD OF MEASURING THE PARTIAL PRESSURE OF A GAS

Filed July 20, 1961          2 Sheets-Sheet 1

INVENTOR.
HAROLD WARNER
BY Henry W. Kaufmann
AGENT

Sept. 22, 1964            H. WARNER            3,149,921

METHOD OF MEASURING THE PARTIAL PRESSURE OF A GAS

Filed July 20, 1961                          2 Sheets-Sheet 2

INVENTOR.
HAROLD WARNER
BY *Henry W. Kaufmann*
AGENT

# United States Patent Office 3,149,921
Patented Sept. 22, 1964

3,149,921
METHOD OF MEASURING THE PARTIAL
PRESSURE OF A GAS
Harold Warner, Norristown, Pa., assignor to General
Electric Company, a corporation of New York
Filed July 20, 1961, Ser. No. 125,592
5 Claims. (Cl. 23—232)

This invention pertains to the art of measuring the concentration of gases, and more particularly to the art of measuring the partial pressure of chemically reactive gases.

The process of producing electricity by combining two mutually reactive gases has been known for many years; every elementary electro-chemistry text points out that an electrolytic cell in which platinum electrodes are employed in the electrolysis of water can be used as a (by modern terminology) "fuel cell" in that hydrogen and oxygen, with the help of platinum catalysts, can recombine and produce electricity, albeit very inefficiently and at a slow rate. Economically useful fuel cells have been developed of late; particular interest attaches to cells which can be used for combining hydrogen and oxygen at rates which are high for the volume of the apparatus required. (See, for example, "Electrical Engineering," vol. 79, No. 8, August 1960, pp. 699–700, "Fuel Cell Power Pack Developed for Military Use"; also, "Fuel Cells—Power for the Future," David Adams, Editor, Harvard School of Business, 1960.) It is evident from very elementary physical-chemical considerations that stoichiometric ratios of hydrogen and oxygen will be consumed, i.e., if hydrogen and oxygen combine to produce water, twice as many hydrogen atoms as oxygen atoms will be consumed. If there is a deficiency of one kind of atoms required to maintain this ratio, the other kind of atoms which are in excess will simply not combine; the ratio will automatically be maintained. Similarly, it is evident that the rate of production of electrical charge will be proportional to the rate of combination of atoms. Thus the parameters involved in fuel cell operation are rather rigidly interlocked; the consumption of gases is controlled by the flow of electric current, and the proportion of gases consumed is self-adjusting; if there is a deficiency of one of the reactant gases, the current will be limited to that which can be produced by reaction of the gas which is in smallest supply. For use in energy conversion, it would be an advantage if a deficiency of hydrogen could be compensated by a surplus of oxygen, but this is not the case. It has occurred to me that this characteristic, which is a defect for ordinary use of the fuel cell, can be turned to advantage to produce a device and method for measuring the concentration of a reactant gas. I provide a fuel cell adapted to consume oxygen and hydrogen at some particular maximum rate, and to produce a corresponding output of electric current. If, for example, oxygen is to be measured, I feed the oxygen or oxygen-containing mixture to the fuel cell at a rate less than the maximum that the cell can consume. The hydrogen supply is made slightly greater than is required to utilize the maximum expected input of oxygen; and the output load is adjusted to insure that the current flow will be determined primarily by the available reactant and not by the external circuit resistance. Since the rate of input of oxygen depends actually upon the concentration of oxygen maintained at the oxygen-absorbing surface, and since the current is determined, under the circumstances described, by the rate of input of oxygen, regardless of the presence of other non-reacting gases, this current is a measure of the concentration of oxygen. Alternatively, by providing an excess of oxygen, the same method may be used to measure the concentration of hydrogen. More generally, the method is applicable to the measurement of concentrations of any of various reactive gases which can be used as fuels in fuel cells, recognizing that the term "fuel" must be broadened to include both oxidizers and reducers. This is reasonable, particularly in view of the fact that in space both are likely to be equally expensive to provide, and on some planets having hydrocarbon atmospheres, oxidizing materials may enjoy the peculiar economic attractiveness that fuel oil and natural gas do on earth.

It is thus apparent that my invention has the basic object of measuring a reactant gas or vapor, even in the presence of other non-reactant gases or vapors.

For the better understanding of my invention, I have provided figures of drawing in which FIG. 1 represents symbolically the elements of a fuel cell and their relation to each other;

Figure 1:
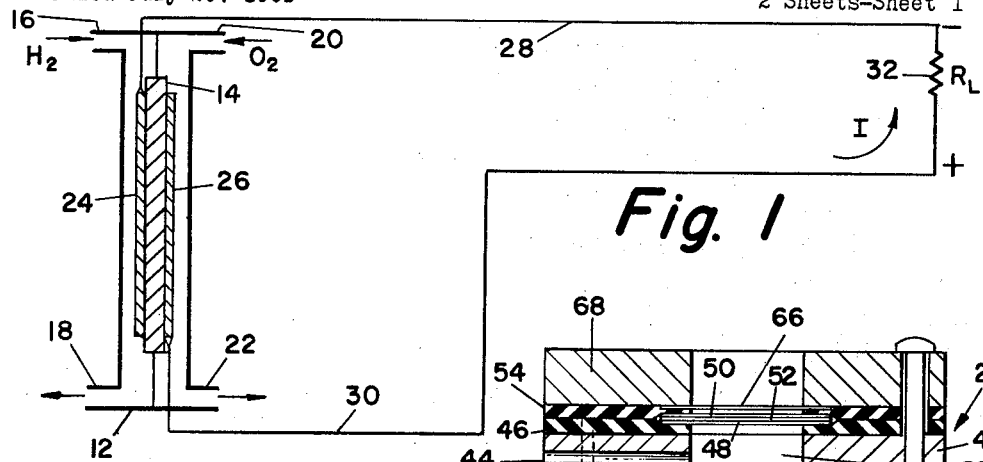

Referring in more detail to FIG. 1, there is represented symbolically a housing 12 which is divided into two parts by an ion-exchange membrane 14, one part of housing 12 having an inlet port 16 and an outlet port 18, the other part of housing 12 having an inlet port 20 and an outlet port 22. In close contact with one side of the membrane 14 is an anode 24 and in close contact with the other side of the membrane 14 is a cathode 26. Conductors 28 and 30, respectively, connect the two electrodes to an electrical load 32, represented by the conventional symbol for a resistor. The membrane 14 may be an anionic ion exchange resin moistened with potassium hydroxide solution. The electrodes 24 and 26 may be of platinum mesh or may be covered with the finely-divided form of platinum known as platinum black, which may be supported in a number of known ways.

The well-known method of operation of the fuel cell represented in FIG. 1 is as follows: hydrogen is admitted through inlet 16 and oxygen is admitted through inlet 20, the hydrogen being catalytically adsorbed by electrode 24, the oxygen being similarly adsorbed by electrode 26. The hydrogen combines with hydroxyl ions, each hydrogen atom discharging an electron to the electrode 24, the product of the combination being water. The oxygen combines with water in the electrolyte, receiving electrons from the electrode 26, and forming hydroxyl ions. The combined action of release of electrons at electrode 24 and absorption of electrons at electrode 26 produces current flow, as indicated by the polarity marks associated with conductors 28 and 30, through load 32. An excess of hydrogen and oxygen both may be provided, with the excess gases flowing out through outlets 18 and 22, respectively, and the rate of consumption being limited only by the load resistance and the rates of diffusion involved in the electrochemical reactions described.

Figure 2:
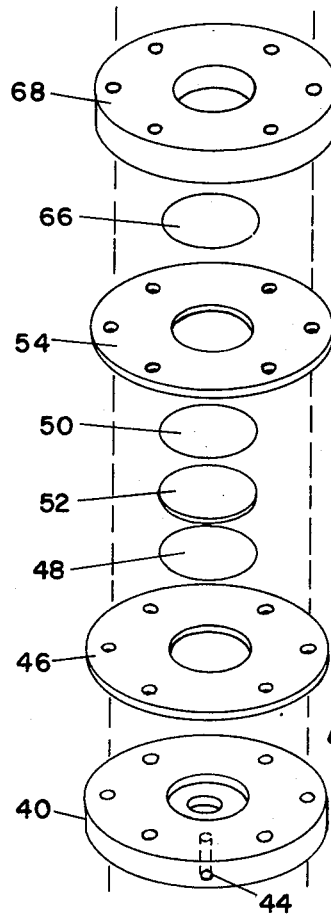
FIG. 2 represents an embodiment of my invention, the individual parts being represented as somewhat spread apart for greater clarity.

FIG. 2 represents a fuel cell designed for use as a partial pressure indicator, the individual parts being represented separately although they are, in fact, assembled together tightly as indicated by the dashed location lines. Starting from the bottom of the figure, a hydrogen reaction chamber 40 (which may conveniently be of metal) is represented with a central inlet port 42 and an outlet port 44, for connection to a hydrogen source not shown. Gasket 46 may be of any suitable stable flexible material such as a synthetic rubber. Catalytic electrodes 48 and 50 are of suitable size and shape to be pressed firmly against ion exchange membrane 52, the sandwich of items 48, 50, and 52 being compressed between gasket 46 and gasket 54. Since very small currents flow between the electrodes 48 and 50, the electrical connections to these may be of very small wires or thin metal foil (not separately represented here) passing out between the gaskets 46 and 64 to the outside. It has been found that, at oxygen partial pressures in excess of approximately 600 millimeters of mercury, linearity of calibration is more readily achieved if the rate of oxygen flow to the electrode 50 is limited. This is the purpose of diffusion membrane 66, which may be of oxygen-permeable plastic material of thickness and permeability commensurate with the pressure range to be covered. Retainer plate 68, which may conveniently be of metal, is similar to reaction chamber 40 in forming the end plate for the overall assembly of FIG. 2. As plate 68 has a central hole passing all the way through it, it is in effect a somewhat elaborated washer. In actual use, the assembly is "taken up" tightly by bolts or other suitable fastenings through the unnumbered peripheral holes in chamber 40, gaskets 46 and 64, and retainer plate 68, some of which are traversed in the figure by the dashed location line. It is, of course, evident that the identification of 40 as a hydrogen reaction chamber is purely for convenience in discussion; the device may equally readily be operated as a hydrogen partial pressure sensor, in which case a supply of oxygen rather than hydrogen would be fed into chamber 40.

Figure 3:
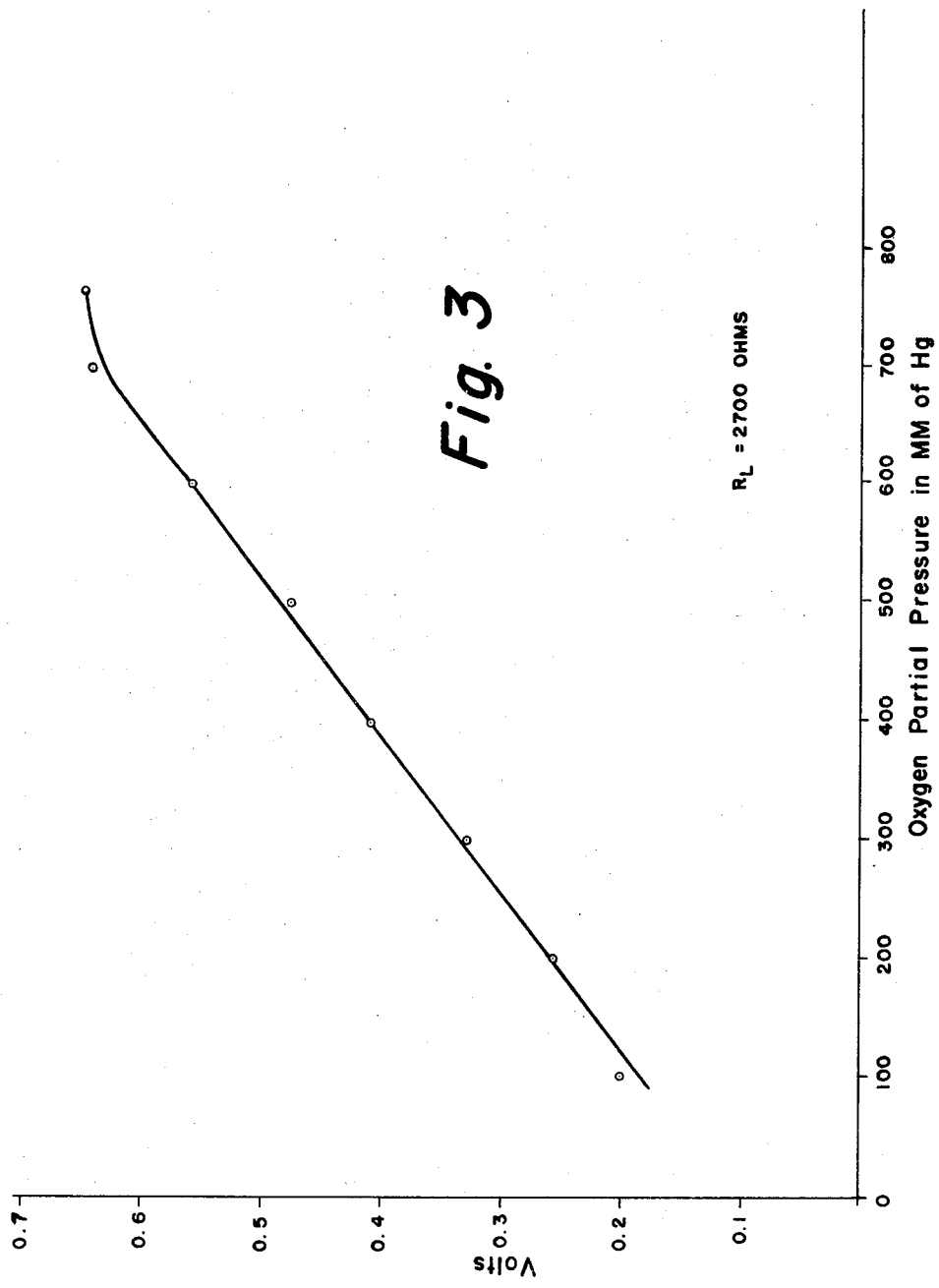
FIG. 3 represents the calibration curve of a measuring cell.

In a model actually used, the diameter of electrodes 48 and 50 was about 5/8 of an inch; the electrode 48, exposed to hydrogen, consisted of a mixture of platinum black in fluorocarbon plastic, supported by a platinum wire mesh. Electrode 50 was simply a fine platinum wire mesh. When a load resistance of 2700 ohms was connected to the two electrodes, the potential across the load resistor varied substantially linearly from 0.2 volt for a partial oxygen pressure of 100 millimeters of mercury to 0.64 volt for a partial oxygen pressure of 700 millimeters of mercury. This variation is represented in FIG. 3. It will be perceived that (a) the linearity from 100 to 600 millimeters is excellent; (b) linearity appears to fail somewhat for this cell beyond 700 millimeters.

The load resistance which produces best linearity is, to some extent, a matter for experiment but in accordance with definite principles. It is frequently convenient to employ output voltage of the cell across a load as an indication of output. At no load, the cell potential will rise to a characteristic maximum (about one volt, for the system described) which depends only slightly upon the partial pressure of reactant available. It will be observed (FIG. 3) that the satisfactory load of 2700 ohms reduced the cell terminal voltage to roughly half of its open-circuit voltage. Linearity of output is, of course, not essential and is not necessarily even desirable in all applications.

Since many of the processes involved in the action of the cell are functions of temperature, the cell temperature should be maintained constant within reasonable limits.

Figure 4:
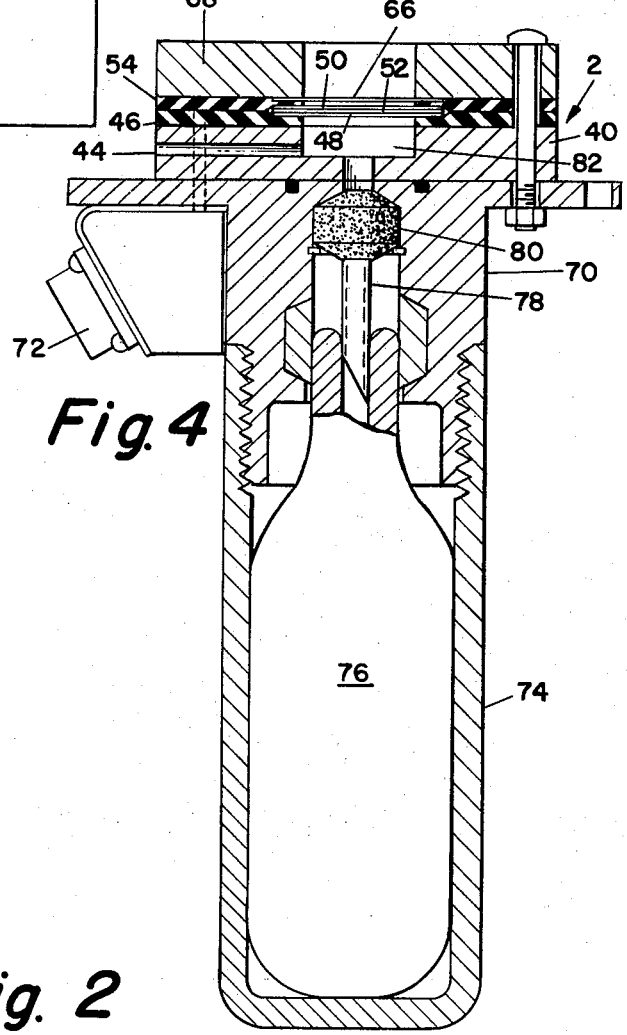
FIG. 4 represents a complete assembly of a measuring device complete with a source of reactant gas.

FIG. 4 represents in section a complete assembly of a cell 2, similar to the representation of FIG. 2, fastened to a base 70 which carries a pigmy, or miniature, electrical connector 72 and which has a mating cover or capsule retainer 74 adapted to hold a small hydrogen storage capsule 76 in position against a hollow piercing stylus 78 so that the hydrogen will leak through flow regulator 80 (which may be a porous ceramic plug) into the chamber 82 of the hydrogen reaction chamber of cell 2. It is evident that this embodiment provides a completely self-contained sensor for partial pressure of oxygen. It may be calculated that 7 milliliters of hydrogen at NTP will produce one ampere-minute. Since the current drawn from the sensor is of the order of milliamperes or less, about 7 microliters per minute of hydrogen will suffice to operate the sensor. This quantity is sufficiently small to effectively insure that an explosive concentration of hydrogen will never be built up by the exhaust of unused hydrogen from such a gauge, under any ordinary conditions of operation. It is also sufficiently small to insure that the operational life of a small container of hydrogen will be usefully long.

The output of the sensor may, of course, be fed simply to an indicating device such as a voltmeter or milliammeter in series with a resistor; or it may be connected to various other devices such as analogue computers for process control, or to analogue-digital converters for digital processing of its indications. All these possibilities are subsumed under the conventional load symbol 32 which is thus more adequately representative than a meter symbol would be.

It is also evident that the basic principle of adjusting a fuel cell so that its output is limited by a particular single reactant upon whose concentration the cell output therefore depends, and utilizing this for measurement purposes, it not confined to a single type of fuel cell nor to any specific combination of reactants.

What is claimed is:

1. The method of measuring the partial pressure of a chemically active gas which comprises the steps of:

providing a fuel cell adapted to receive the said chemically active gas at a first electrode and to receive at a second electrode separated from the first electrode by an electrically conductive barrier a reactant adapted to react stoichiometrically with the said chemically active gas with production of an equivalent flow of electric current between the said first and second electrodes;

providing the said reactant at the said second electrode at a rate in excess of the rate of consumption of the said reactant at the highest partial pressure of the said chemically active gas to be measured;

providing between the said first and second electrodes a path for electric current of resistance sufficiently low not to limit the flow of current between the said electrodes at a partial pressure of the said chemically active gas to be measured;

applying the said chemically active gas at the said first electrode, at a partial pressure to measured;

measuring the electric current in the said path as a measure of the said partial pressure.

2. The method of measuring the partial pressure of oxygen which comprises the steps of:

providing a fuel cell adapted ot receive oxygen at a first electrode and to receive hydrogen at a second electrode separated from the said first electrode by an ionically conductive barrier, to catalyze the ionic reaction of the said oxygen at the said first electrode and the ionic reaction of the said hydrogen at the said second electrode, and to produce between the said electrodes electric current flow equivalent to the stoichiometric reaction between the products of the said ionic reactions;

providing the said hydrogen at the said second electrode at a rate in excess of the consumption of the said hydrogen at the highest partial pressure of oxygen to be measured;

providing between the said first and second electrodes a path for electric current of resistance sufficiently low not to limit the flow of current between the said electrodes at a partial pressure of oxygen to be measured;

applying the said oxygen at the said first electrode, at a partial pressure to be measured;

measuring the electric current in the said path as a measure of the said partial pressure.

3. The method of measuring the partial pressure of hydrogen which comprises the steps of:

providing a fuel cell adapted to receive hydrogen at a first electrode and to receive oxygen at a second electrode separated from the said first electrode by an ionically conductive barrier, to catalyze the ionic reaction of the said hydrogen at the said first electrode and the ionic reaction of the said oxygen at the said second electrode, and to produce between the said electrodes electric current flow equivalent to the stoichiometric reaction between the products of the said ionic reactions;

providing the said oxygen at the said second electrode at a rate in excess of the consumption of the said oxygen at the highest partial pressure of hydrogen to be measured;

providing between the said first and second electrodes a path for electric current of resistance sufficiently low not to limit the flow of current between the said electrodes at a partial pressure of hydrogen to be measured;

applying the said hydrogen at the said first electrode, at a partial pressure to be measured;

measuring the electric current in the said path as a measure of the said partial pressure.

4. The method of measuring the partial pressure of oxygen which comprises the steps of:

providing a fuel cell having a first platinum-catalyzed electrode for receiving oxygen, an ion-exchange resin in contact with the said first electrode, a second platinum-catalyzed electrode for receiving hydrogen in contact with the said ion-exchange resin and separated by the said resin from the said first electrode;

providing the said hydrogen at the said second electrode at a rate in excess of the consumption of the said hydrogen at the highest partial pressure of oxygen to be measured;

providing between the said first and second electrodes a path of resistance sufficiently low not to limit the flow of current between the said electrodes at the partial pressure of oxygen to be measured;

applying the said oxygen at the said first electrode, at a partial pressure to be measured;

measuring the electric current through the said resistive load as a substantially linear measure of the said partial pressure.

5. The method of measuring the partial pressure of hydrogen which comprises the steps of:

providing a fuel cell having a first platinum-catalyzed electrode for receiving hydrogen, an ion-exchange resin in contact with the said first electrode, a second platinum-catalyzed electrode for receiving oxygen in contact with the said ion-exchange resin and separated by the said resin from the said first electrode;

providing the said oxygen at the said second electrode at a rate in excess of the consumption of the said oxygen at the highest partial pressure of hydrogen to be measured;

providing between the said first and second electrodes a path of resistance sufficiently low not to limit the flow of current between the said electrodes at the partial pressure of hydrogen to be measured;

applying the said hydrogen at the said first electrode, at a partial pressure to be measured;

measuring the electric current through the said resistive load as a substantially linear measure of the said partial pressure.

References Cited in the file of this patent

Young: Fuel Cells, pages 11–22, Reinhold Publ. Corp., New York, 1960. Published volume of the papers presented at a symposium of the A.C.S. meeting in September 1959.